Patented Sept. 19, 1944

2,358,697

UNITED STATES PATENT OFFICE 2,358,697

PURIFICATION OF PENTAERYTHRITOL

William Frederick Filbert, Woodbury, N. J., assignor to E. I. du Pont de Nemours & Company, Wilmington, Del., a corporation of Delaware No Drawing. Application December 10, 1942, Serial No. 468,490

4 Claims. (Cl. 260—637)

This invention relates in general to the purification of pentaerythritol, and more particularly it pertains to a new and useful process for the separation of pentaerythritol from its impurities, primarily di-pentaerythritol.

Although there are several commercial grades, they may be classified broadly as technical and refined pentaerythritol. The purity and adaptability as intermediate products of these grades, particularly for nitration to the tetranitrate, vary directly with the percent of di-pentaerythritol present. Pure pentaerythritol melts at 260° C., whereas pentaerythritol containing as much as 10% di-pentaerythritol melts at about 235° C. Pure di-pentaerythritol has a melting point of 221° C. Technical pentaerythritol melts between about 235 and 250° C., depending on the percent of di-pentaerythritol present. Refined pentaerythritol melts between about 250 and 260° C., likewise varying with the percent of di-pentaerythritol present.

Appreciable differences in the quality of pentaerythritol tetranitrate produced is due to the purity of the pentaerythritol used. Nitration of low grade pentaerythritol, that is, pentaerythritol containing a substantial amount of di-pentaerythritol, results in operating difficulties and in the production of a pentaerythritol tetranitrate of uncontrollable and inferior quality. Therefore, there is a definite relationship between the quality of the pentaerythritol nitrated and that of the resulting pentaerythritol tetranitrate.

An object of this invention is a process for obtaining pentaerythritol of a higher degree of purity from a mixture containing pentaerythritol and certain impurities, primarily di-pentaerythritol. Another object is a method to free pentaerythritol of its impurities in order to insure a uniform and highly pure product upon nitration of said pentaerythritol. A further object is a process for the production of high quality pentaerythritol from impure pentaerythritol, thus avoiding an unstable nitration mixture and operating obstacles involved in the manufacture of pentaerythritol tetranitrate from the less pure material. An additional object is an economical process for separating pentaerythritol from di-pentaerythritol in technical or other low grades of pentaerythritol, thereby greatly increasing the purity thereof. These and other objects will become better known as the description of my invention proceeds.

According to the present invention, a high quality pentaerythritol may be produced from technical or other low grades of pentaerythritol by sublimation followed by recrystallization of the sublimate from water. My invention is in part based upon my discovery that, if impure pentaerythritol with a melting point as low as 190 to 210° C. is sublimed at about 250° C. and at from about 0 to 35 mm. pressure in a sublimation apparatus, followed by recrystallization of the sublimate either at atmospheric pressure or under vacuum from water at a temperature of about 60 to 75° C., a high quality pentaerythritol is produced which melts between 245 and 260° C. This remarkable purification by vacuum sublimation followed by recrystallization from water in vacuo is achieved because of the fact that di-pentaerythritol is the principal impurity in pentaerythritol. Since the former has a higher molecular weight than the latter, the pentaerythritol sublimes and leaves di-pentaerythritol as a residue. The subsequent recrystallization from water removes volatile decomposition products which accompany the pentaerythritol into the sublimate and are responsible for the instability of the nitration mixture in the production of pentaerythritol tetranitrate.

The example hereinbelow is given in order to make my invention more readily understood and is not to be construed as a limitation thereon.

One hundred grams of contaminated pentaerythritol, containing about 10% of impurities and having a melting point between 190 and 210° C., was introduced into a sublimation apparatus comprising a glass sublimation chamber connected by a ground-glass joint through a short length of wide diameter tubing to a water-cooled glass receiver, said chamber being maintained at a temperature between 240 and 270° C. by a partially insulated air bath, and from 0 to 35 mm. pressure for one to three hours, or until sublimation is discontinued. The sublimate of 97.5% purity was dissolved in an excess of distilled water and the pentaerythritol recovered by vacuum crystallization at a temperature of about 60° C. This gave a pentaerythritol of 0.002% ash content and a melting point of 245 to 260° C.

A particular advantage of the process of the present invention is that it is an economical method for the purification of pentaerythritol. Furthermore, it enables the production of a high quality pentaerythritol tetranitrate from a relatively low quality pentaerythritol. A further advantage of my invention is that it provides a means for controlling the uniformity of pentaerythritol tetranitrate produced from various low grades of pentaerythritol. Keeping in mind the fact that the cost of refined pentaerythritol, which has been desired for the manufacture of pentaerythritol tetranitrate because of the quality of the product produced therefrom and the safety of the nitration operation, is approximately twice that of technical pentaerythritol, and also bearing in mind the fact that heretofore the technical product has been less satisfactory for use in the manufacture of pentaerythritol tetranitrate because of the impurity of said pentaerythritol, these and other advantages and the importance of my invention will be more fully appreciated.

Although hereinbefore I have made an effort to render my invention more readily understood by describing it in detail and citing specific embodiments thereof by way of examples, it is to be understood that said specific disclosures and the discussion of the theories or principles underlying my process are for the purpose of clarity only and are not to be construed as a limitation on this invention as otherwise more broadly made known. Consequently, many variations may be made in the process according to my invention without departing from the scope thereof. For example, the time, temperature, and/or pressure of said process may be varied so long as the desired result is achieved. Furthermore, other alterations in the process such as composition, concentration, or quantity of the materials used, as would occur to one skilled in the art, may be made. I do not intend to be limited, therefore, except as this invention is claimed hereinafter.

I claim:

1. The process for purifying pentaerythritol, which comprises subliming said pentaerythritol at a temperature between about 240 and 260° C. and at a pressure between about 1 and 35 mm.; recovering the sublimate and dissolving the same in an excess of water; and recrystallizing said pentaerythritol by concentrating the solution at a temperature between about 50 and 70° C. and at a pressure substantially less than atmospheric.

2. The process for the preparation of a high melting point pentaerythritol from an impure pentaerythritol contained in a mixture consisting essentially of pentaerythritol and di-pentaerythritol, which process comprises subliming said pentaerythritol at a temperature between about 240 and 260° C. and at a pressure between about 1 and 35 mm. until sublimation is substantially complete; recovering the sublimate and dissolving the same in an excess of distilled water; and recrystallizing said pentaerythritol by concentrating the solution at a temperature between about 50 and 70° C. and at a pressure substantially less than atmospheric.

3. The process for purifying pentaerythritol having a melting point between about 190 and 250° C. contained in a mixture consisting essentially of pentaerythritol and di-pentaerythritol, which comprises subliming said impure pentaerythritol at a temperature between approximately 240 and 260° C. and a pressure between about 0 and 35 mm.; recovering the sublimate and dissolving the same in an excess of distilled water, and recrystallizing said pentaerythritol by concentrating said solution at a temperature between about 50 and 70° C. and at a pressure less than atmospheric.

4. The process for separating pentaerythritol contained in a mixture consisting essentially of between about 80 and 95% pentaerythritol and between about 5 and 20% di-pentaerythritol, which comprises subliming said pentaerythritol at a temperature between approximately 240 to 260° C. and a pressure of approximately 0 to 35 mm.; recovering the sublimate and dissolving the same in an excess of distilled water, and recrystallizing said pentaerythritol by concentrating the resulting solution at a temperature between about 50 and 70° C. and a pressure less than atmospheric.

WILLIAM FREDERICK FILBERT.